United States Patent
Miller et al.

(10) Patent No.: US 9,392,110 B2
(45) Date of Patent: Jul. 12, 2016

(54) FACILITATING INTEROPERABILITY AMONG COMMUNICATION SYSTEMS VIA INTER- AND INTRA-AGENCY COMMUNICATIONS USING A SHARED NETWORK

(75) Inventors: Trent J. Miller, West Chicago, IL (US); Michelle M. Antonelli, Barrington, IL (US); John C. Kay, Elgin, IL (US)

(73) Assignee: MOTOROLA SOLUTIONS, INC., Schaumburg (IL)

( * ) Notice: Subject to any disclaimer, the term of this patent is extended or adjusted under 35 U.S.C. 154(b) by 950 days.

(21) Appl. No.: 12/561,894

(22) Filed: Sep. 17, 2009

(65) Prior Publication Data

US 2011/0065415 A1   Mar. 17, 2011

(51) Int. Cl.
| | | |
|---|---|---|
| G06F 15/16 | (2006.01) |
| H04M 3/493 | (2006.01) |
| H04M 3/42 | (2006.01) |
| H04L 12/58 | (2006.01) |

(Continued)

(52) U.S. Cl.
CPC ............ *H04M 3/4931* (2013.01); *G06F 21/00* (2013.01); *H04L 51/14* (2013.01); *H04L 51/32* (2013.01); *H04M 3/4211* (2013.01); *H04M 3/42059* (2013.01); *H04M 3/493* (2013.01); *H04M 3/5116* (2013.01); *H04M 2203/6009* (2013.01)

(58) Field of Classification Search
CPC ............ H04M 3/4931; H04M 3/4211; H04M 3/42059; H04M 3/493; H04M 3/5116; H04M 2203/6009; H04L 51/14; H04L 51/32; G06F 21/00

USPC ................. 709/229, 207; 379/88.17, 218.01; 726/28

See application file for complete search history.

(56) References Cited

U.S. PATENT DOCUMENTS

| | | | |
|---|---|---|---|
| 5,058,152 A | | 10/1991 | Solomon et al. |
| 5,926,754 A | * | 7/1999 | Cirelli et al. .................. 455/417 |
| 6,157,829 A | | 12/2000 | Grube et al. |

(Continued)

FOREIGN PATENT DOCUMENTS

| | | |
|---|---|---|
| EP | 0781026 A2 | 6/1997 |
| EP | 0781926 A2 | 6/1997 |

(Continued)

OTHER PUBLICATIONS

Peterson, J., "Network Working Group," Request for Comments: 3323, Category: Standards Track, pp. 22, Nov. 2002.

(Continued)

*Primary Examiner* — Jungwon Chang

(57) ABSTRACT

Providing contact information via a directory service comprises a request being received from an originator to obtain at least a portion of contact information associated with a target. A first policy associated with the originator is identified, and a second policy that is associated with the target is identified. Based on at least one of the policies, it is determined whether a portion of the contact information associated with the target is authorized to be presented to the originator. If authorized, the portion of the contact information is presented to the originator. Upon receiving a request from the originator to establish communication with the target, it is determined whether a portion of contact information associated with the originator is authorized to presented to the target based on at least one of the policies. If authorized, the portion of the contact information associated with the originator is presented to the target.

20 Claims, 5 Drawing Sheets

(51) Int. Cl.
*G06F 21/00* (2013.01)
*H04M 3/51* (2006.01)

(56) References Cited

U.S. PATENT DOCUMENTS

| | | | |
|---|---|---|---|
| 6,175,619 B1 | 1/2001 | Desimone | |
| 6,480,885 B1 * | 11/2002 | Olivier | 709/207 |
| 7,340,048 B2 | 3/2008 | Stern et al. | |
| 7,447,756 B2 | 11/2008 | Malik | |
| 7,533,126 B2 * | 5/2009 | Oran | H04M 3/436 |
| 7,536,360 B2 * | 5/2009 | Stolfo et al. | 705/68 |
| 2009/0276461 A1 | 11/2009 | Kuehner et al. | |
| 2011/0170549 A1 * | 7/2011 | Gallant et al. | 370/395.52 |

FOREIGN PATENT DOCUMENTS

| | | |
|---|---|---|
| EP | 0847177 A2 | 6/1998 |
| GB | 2402017 A | 11/2004 |
| WO | 9501037 A1 | 1/1995 |

OTHER PUBLICATIONS

International Preliminary Report on Patentability and Written Opinion for counterpart International Patent Application No. PCT/US2010/048221 issued on Mar. 20, 2012.
PCT Invitation to Pay Additional Fees and Communication Relating to the Results of the Partial Internation Search Dated Jan. 5, 2011.
PCT International Search Report Dated Mar. 9, 2011.

* cited by examiner

| | RESOURCE IDENTIFIER | GROUP MEMBERSHIP | HOME IDENTIFIER | SPECIALIZED CAPABILITIES | DEVICE |
|---|---|---|---|---|---|
| 222 → | "BEAT 4 RESPONDERS" | N/A | POLICE.ROSELLE.IL.GOV | HASMAT CERTIFICATION | PDA |
| 224 → | OFFICER JOHN SMITH | "BEAT 4 RESPONDERS" | POLICE.ROSELLE.IL.GOV | HASMAT CERTIFICATION | PTT |
| 226 → | POLICE CHIEF | "DETECTIVES", "BEAT 4 RESPONDERS" | POLICE.ROSELLE.IL.GOV | RESCUE DIVER CERTIFICATION | DESKTOP |
| 228 → | POLICE CHIEF | N/A | POLICE.ROSELLE.IL.GOV | RESCUE DIVER CERTIFICATION | DESKTOP |
| 230 → | INTERSTATE 90 TRAFFIC CAMERA | N/A | POLICE.ROSELLE.IL.GOV | NONE | CAMERA/MP4 |
| 232 → | INCIDENT 436 COMMANDER | N/A | POLICE.ROSELLE.IL.GOV | NONE | LMR PORTABLE |
| | ↑ 202 | ↑ 204 | ↑ 206 | ↑ 208 | ↑ 210 |

*FIG. 2A*

| *FIG. 2A* |
|---|
| *FIG. 2A* \| *FIG. 2B* |

| APPLICATION | CONTACT ADDRESS | RESOURCE CONTEXT TYPES | POLICY WHEN DS ORIGINATOR | POLICY WHEN TARGET RESOURCE |
|---|---|---|---|---|
| TELEPHONY | 888-888-8888 | AVL, WEATHER, TRAFFIC | O-24 | T-6 |
| PTT | 111*1111*1111 (UFMI) | AVL, WEATHER, TRAFFIC | GROUP | GROUP |
| PRESENCE | PRES:POLICECHIEF @POLICE.ROSELLE. IL.GOV | GPS | O-76 | T-86 |
| VoIP | SIP:POLICECHIEF @POLICE.ROSELLE. IL.GOV | GPS | GROUP | GROUP |
| SIP | SIP:I90CAMERA @POLICE.ROSELLE. IL.GOV | FIXED, TRAFFIC | O-29 | T-88 |
| PTT | WACN/ SYSTEM | LPS | O-2 | T-16 |
| ↑ 212 | ↑ 214 | ↑ 216 | ↑ 218 | ↑ 220 |

*FIG. 2B*

FACILITATING INTEROPERABILITY AMONG COMMUNICATION SYSTEMS VIA INTER- AND INTRA-AGENCY COMMUNICATIONS USING A SHARED NETWORK

FIELD OF THE INVENTION

The present invention generally relates to radio frequency (RF) communications and, more particularly, to facilitating interoperability among communication systems via inter- and intra-agency communications using a shared network.

BACKGROUND OF THE INVENTION

The continued proliferation of RF communication systems presents opportunities to improve communications among various groups, particularly public safety agencies. For example, with improved communications, coordination of emergency response efforts by different public safety agencies can be improved. In addition, time delays in emergency response services, which often occur due to poor communication among the public safety agencies, can be mitigated.

Notwithstanding, different agencies commonly use communication systems that are incompatible with one another. For example, a local police department may communicate using a particular communication service that is different than communication services being used by state and federal agencies. In this example, it would be desirable to deploy a public safety wide area network (WAN) to support communications among local, state and federal public safety agencies, while ensuring compatibility with existing communication infrastructure. Moreover, use of the public safety WAN should not be overly cumbersome to those that will be using the WAN. Thus, it would be desirable to facilitate interoperability among communication systems that use a shared network.

BRIEF DESCRIPTION OF THE FIGURES

Various embodiments of the present invention will be described below in more detail, with reference to the accompanying drawings, in which:

FIGS. 2A and B depict an example of the type of data stored in the DS in accordance with the present invention;

DETAILED DESCRIPTION

Figure 1:
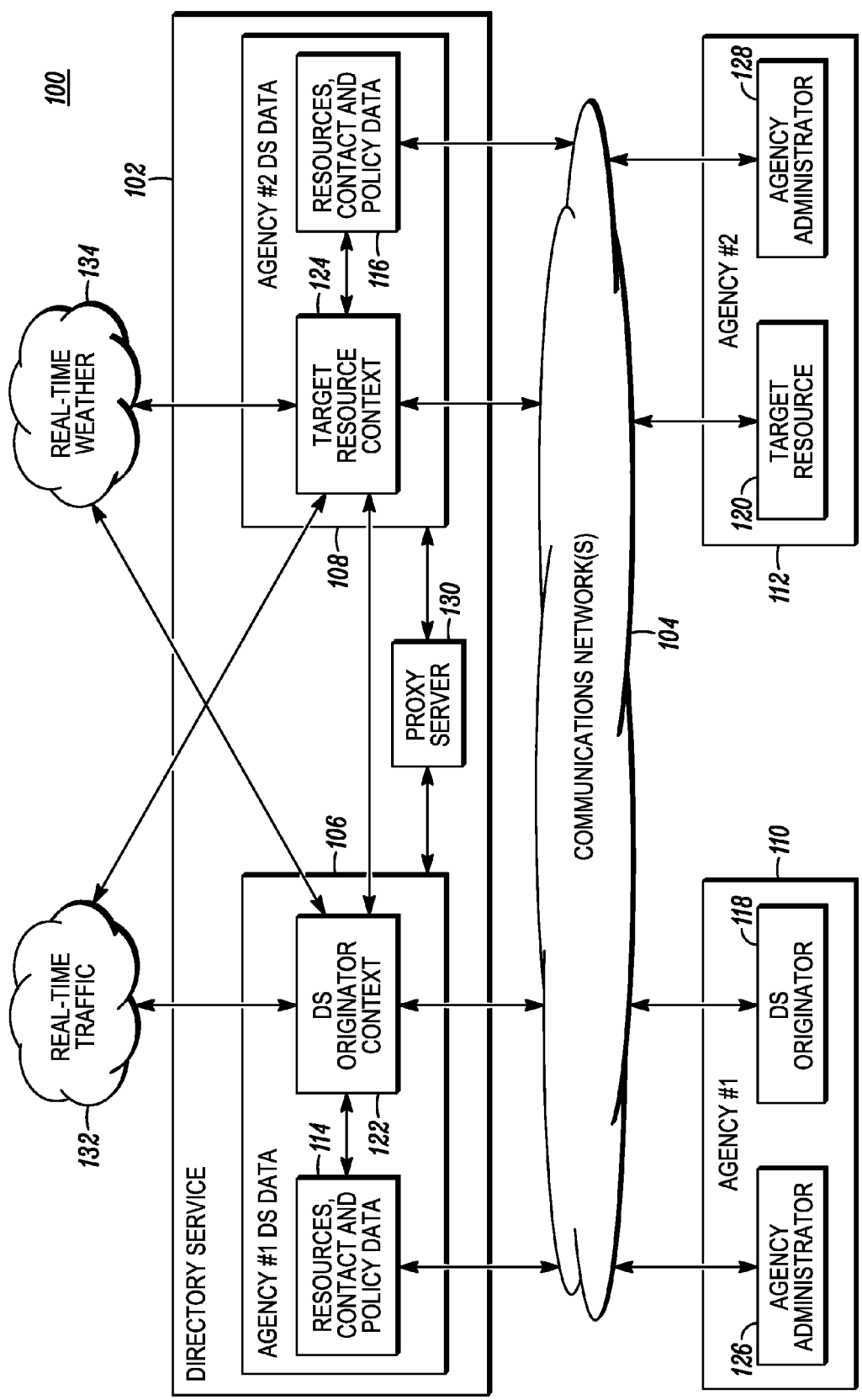
FIG. 1 depicts a multi-agency communications network with a shared directory service (DS) function in accordance with the present invention.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to the management of data and operation of a directory service (DS). More particularly, these arrangements describe methods and systems which may be used to update data in a DS which support and facilitate intra-agency communication as well as inter-agency communication. It is important to note, as used herein, the term agency is defined as a grouping of one-to-many resources sharing a private communication network and applications (e.g. public safety police, public safety fire, a company, a family, an organization, an enterprise, or the like). The following examples will be focused on public safety applications, however, it will be obvious to one skilled in the art that the spirit and scope of the present invention is not limited to such, and can be used by other telecommunication systems, such as pubic and private wired and wireless systems (e.g. Long Term Evolution (LTE), Worldwide Interoperability for Microwave Access (WiMAX), Code Division Multiple Access (CDMA), High Rate Packet Data (HRPD), Universal Mobile Telecommunications System (UMTS), Project 25, Land Mobile Radio (LMR), etc.), and enterprises.

DS data for an agency can represent various agency resources and define various policies applicable to the agency resources when participating in intra-agency and/or inter-agency communications. A DS originator can retrieve DS data from the DS for a target resource, subject to at least one policy set forth by either the DS originator's agency or by the target resource's agency. DS originator and target resource are defined below with respect to FIG. 1. The actual amount of information that is allowed to be viewed by the DS originator is a function of the policy associated with the DS originator, the policy associated with the target resource, both policies associated with the DS originator and the target resource, or a combination thereof. When communications are initiated via the DS, the DS can enforce the applicable policy/policies to provide a level of privacy for the agency resources, as well as mitigate the risk of unauthorized contact with the agency resources. For example, the policy data can indicate access policies, viewing policies, or any other policies that are applicable to communications that are established using the DS.

In some instances, it may be desirable for some agencies to guard certain types of contact information for an agency resource, for instance agency resource identifiers (e.g. a responder's real name) and contact address (e.g. a telephone number). As used herein, contact information refers to the total set of data an agency administrator may provision for an agency resource in the DS. Contact information includes, but is not limited to, at least one of the following: a resource identifier, a group membership, a home identifier, a specialized capability, a contact address associated with a type of application, a type of device associated with the contact address, a type of application associated with the contact address, a context type, dynamic contextual information, an overall policy, a specific policy when the agency resource is a DS originator, a specific policy when the agency resource is a target resource, or the like. Indeed, an agency may only want authorized personnel to have access to this contact information. The interconnection of multiple agencies onto a shared network (e.g. Internet protocol (IP) network), however, tends to increase the probability that contact information, or a portion of the contact information, for an agency resource may be inadvertently shared to other agencies or other agency resources within the same agency using the same network. Thus, the arrangements described herein address this concern. For example, rather than presenting an actual resource identifier to a DS originator and/or a target resource being contacted, a proxy resource identifier can be presented (e.g. "Chief of Police" instead of "Officer John Smith").

Further, in lieu of presenting an actual contact address for a target resource to the DS originator, a proxy contact address can be presented. Similarly, when the DS originator attempts to establish communication with the target resource, a proxy contact address for the DS originator can be presented to the target resource. The proxy contact address can be dynamically generated for use only by the DS originator and/or the target resource, thereby preventing others from using the proxy contact address to establish contact with the target resource/DS originator. Once the DS originator has obtained a contact address (i.e. an actual contact address or a proxy contact address) from the DS, communication can be initiated with the target resource through the DS itself. In some embodiments, when the DS is functioning as a proxy, the DS can insert itself into communications (e.g. calls, sessions, etc.) between the DS originator and target resource. This insertion allows the DS to replace a proxy contact address with the target resource's actual contact address. Additionally, this insertion allows the DS to protect the DS originator's contact information from the target resource. Accordingly, a level of privacy can be maintained for agency resources that use the DS to initiate and/or receive communications. Let us turn to the figures to discuss the invention in greater detail.

FIG. 1 depicts a communication system 100 that is useful for understanding the present invention. The communication system 100 can include a DS 102, which may be implemented using a database instantiated on a server or implemented in any other suitable manner. The DS 102 can facilitate WAN communications among various communication systems, such as those used by various agencies.

In this regard, the communication system 100 can include one or more communication networks 104 via which resources from the various agencies may establish contact and communicate with one another. The communication network(s) 104 can include one or more WANs (e.g. the Internet, the World Wide Web, a wide area telecommunication system, dedicated fiber links, metro-Ethernet, T1, E1, etc.), one or more local area networks (LANs), IP based and/or circuit based telephone networks, or any other suitable wired or wireless communication network. The communications among agency resources can include, but are not limited to, full-duplex communications (circuit telephony calls, voice over internet protocol (VoIP) telephony calls, or the like), half-duplex communications (e.g. land mobile radio, push-to-talk), simplex communications (e.g. broadcast services), data communications (e.g. text messaging, instant messages (IMs), e-mails, application sharing sessions, data requests, data uploads, machine-to-machine), video communications (e.g. video conference requests/video conferences, network conference requests/video conferences, video surveillance), and the like.

The DS 102 can include DS data 106, 108 for a plurality of agencies authorized to communicate using the DS 102. For example, the DS 102 can include DS data 106 for a first agency 110 and DS data 108 for a second agency 112. The DS data 106, 108 can include other data 114, 116 related to resources within the respective agencies 110, 112, contact information for the resources and policy information for such resources. The data 114, 116 also can indicate the agencies with which the resources are associated, for instance a home domain. In illustration, the data 114, 116 can indicate home identifiers for agencies with which the resources are associated. A home identifier can identify, for example, a name of an agency, a domain name associated with an agency, the P25 Inter-Subsystem Interface (ISSI) Wide Area Communication Network (WACN) Identifier, a P25 ISSI System Identifier associated with the agency, a P25 ISSI radio frequency subsystem (RFSS) identifier, or an agency in any other suitable manner.

In one example, one or more resource identifiers can be associated with each agency resource included in the data 114, 116. As used herein, a resource identifier is a human-readable name, role, or description associated with an agency resource. Examples of resource identifiers include, but are not limited to, proper names (e.g. "Officer John Smith"), device names (e.g. "Toll-way Camera"), responder roles (e.g. "Chief of Police" or "Incident Commander"), and communication group names (e.g. "Beat 4 Responders").

In another example, the listing of resources can be limited to resource identifiers for those resources that are authorized to communicate via the DS 102. The listing of resources also may include identifiers for devices with which data may be exchanged. These resource identifiers can be included in addition to, or in lieu of, resource identifiers that identify individual agency resources.

Hereinafter, an agency resource that is requesting from the DS 102 contact information associated with another resource or initiating a call/session to another resource through the DS will be referred to as a "DS originator" (e.g. DS originator 118). The other resource with which the requested contact information is associated will be referred to as a "target resource" (e.g. target resource 120). In this context, a target resource 120 can be a resource of an agency 112 or the agency 112 itself. Furthermore, a DS originator 118 and the target resource can be associated with a common agency or a different agency.

When a DS originator 118 receives contact information for a target resource 120, the DS originator 118 can utilize the DS 102 to attempt to establish communication with the target resource 120. If the DS originator 118 does not know specific contact address information for the appropriate agency resource that is to be contacted, the DS originator 118 can access from the DS 102 a list of one or more target resources that may be appropriate. For example, in a mutual aid scenario which requires inter-agency communication, the DS originator 118 may not know a specific resource identifier of the target resource 120 that should be contacted. Nonetheless, if the DS originator 118 knows that the agency 112 likely includes a suitable resource, the DS originator 118 can access the DS 102 to retrieve from the data 116 a listing of resource identifiers, and suitable means for contacting the corresponding agency resources. The DS originator 118 can then select a resource identifier from the list to be the target resource 120, and attempt to establish communication with that agency resource.

Moreover, if the DS originator 118 is not sure of which agency to which to establish communication is most suitable, the DS 102 can choose to present a listing of resource identifiers from multiple agencies. For instance, the DS 102 can present to the DS originator 118 a listing of available agencies, and the DS originator 118 can select potentially suitable agencies from such listing. The DS may also display a listing of agencies with jurisdiction (or nearby jurisdiction) based on the DS originator's location, the location of a nearby incident, or the location designated by a Computer Aided Dispatch (CAD) operator.

For agency resources that are authorized to receive communications via the DS 102, static contact information can be provided. In one arrangement, the static contact information can include actual contact addresses for the resources. Examples of such contact addresses include, but are not limited to, telephone numbers, radio identifiers, instant messaging identifiers, e-mail addresses, internet protocol (IP) addresses, uniform resource identifiers (URIs), user identifiers, Telecommunications Industry Association (TIA) Inter-RF Subsystem Interface (ISSI) unit identifiers (UIDs), TIA ISSI group identifiers (GIDs), TIA ISSI Wide Area Communication Network (WACN) identifiers, TIA ISSI system identifier, TIA ISSI RFSS identifiers, session initiation protocol (SIP) uniform resource identifiers (URIs), and/or any other addresses that may be used to contact the resource.

The static contact information also can include data that indicates the types of devices, applications and/or communication protocols to which the static contact information pertain. For example, a type of communication device and a communication protocol applicable to communicating with the device can be associated with a particular telephone number, radio identifier, instant messaging identifier, e-mail address, IP address, push-to-talk address, etc.

Further, presence information may be provided to indicate when various forms of communication are applicable for contacting the individual resources, though this need not be the case since such information can be dynamically retrieved in real-time, as will be described.

In addition, the data 114, 116 can include group membership affiliations for one or more resources. For example, a particular resource may be associated with a particular group of responders (e.g. 'beat 4 responders'), a particular agency resource classification (e.g. ranking, role, or position), and the like. In such an arrangement, the DS originating group policies and/or target resource group policies that are assigned to the resources can be based on the resource's group membership affiliations. The data 114, 116 also may include any other data that may be pertinent to a particular resource or group of resources, for instance, a specialized knowledge, capability, certification, and the like.

In one aspect of the inventive arrangements, resource identifiers also can be provided for specific positions and/or roles within an agency. For example, a resource identifier may be provided for "Battalion Commander," "Incident 436 Commander," "Lead Investigator," "Governor," and the like. The positions and/or roles for a resource may remain static or can be dynamically associated with the resources based on resource context of the DS originator (hereinafter "DS originator context") 122 and/or resource context of the target resource (hereinafter "target resource context") 124, as will be described herein in greater detail. As used herein, the term "DS originator context" means information that indicates a current state of static and/or dynamic conditions associated with DS originator 118. As used herein, the term "target resource context" means information that indicates a current state of static and/or dynamic conditions associated with a target resource 120. It should be noted that, depending on the system design, requirements and/or embodiment, the DS originator context and target resource context can be updated separately or simultaneously in the DS 102. Further, the DS originator context and the target resource context can be updated in real-time or non-real time.

In another aspect of the inventive arrangements, the resource identifiers further may include identifiers of specific devices with which data may be exchanged. For example, resource identifiers can be provided for traffic cameras (e.g. "Interstate 90 Traffic Camera"), specific communication devices (e.g. radios that are shared among multiple personnel shifts), etc. Accordingly, these devices can be considered agency resources.

The data 114, 116 further can include policy data for each agency resource. The policy data can, for example, identify originator policies applicable to when a resource is a DS originator 118, and target policies applicable to when the resource is a target resource 120. In this regard, the term "originator policy," as used herein, means a policy that is associated with a DS originator 118. Similarly, the term "target policy," as used herein, means a policy that is associated with a target resource.

The originator policies also can define access policies, viewing policies, and/or any other policies that may be applicable when an agency resource is a DS originator 118. Similarly, the target policies can define access policies, viewing policies, and/or any other policies that may be applicable when an agency resource is a target resource 120.

For example, the originator policies can define originator viewing policies which include one or more identifiers that indicate those target resources 120 for which the DS originator 118 may view at least a portion of the contact information, as well as those target resources 120 for which the DS originator 118 may not view agency resource information. Likewise, the target policies can specify target viewing policies which include one or more identifiers that indicate those agencies 110 or DS originators 118 that are permitted to view at least a portion of the contact information associated with the target resource 120, as well as those agencies 110 and/or DS originators 118 that are not permitted to view at least a portion of the contact information associated with the target resource 120.

When a DS originator 118 requests from the DS 102 information for one or more target resources 120, the DS 102 can access the originator viewing policies associated with the DS originator 118 and the target viewing policies associated with the target resource(s) 120, and process these policies to determine whether to present contact information for the target resource(s) 120 to the DS originator 118. If the originator viewing policies or the target viewing policies indicate that the DS originator 118 is not authorized to view contact information for the target resource(s) 120, the DS 102 will not present the contact information to the DS originator 118. If, however, neither the originator viewing policies nor the target viewing policies indicate that the contact information may not be presented to the DS originator 118, then the DS 102 can present the contact information to the DS originator 118.

Rather than only indicating whether any of the contact information may be presented to the DS originator 118, the originator viewing policies and target viewing policies also can specify the type(s) of information, if any, that is authorized to be presented to a DS originator 118 and/or to the agency resource when the agency resource is a target resource 120 is being contacted by a DS originator 118. In illustration, the viewing policies can indicate contact information, such as resource identifiers (e.g. names) and contact addresses (e.g. telephone numbers, radio identifiers, IM identifiers, e-mail addresses, IP addresses, push-to-talk identifiers, SIP URIs, etc.) that may be presented and/or that may not be presented to a DS originator 118 and/or target resource 120.

When an originator viewing policy and/or target viewing policy indicates that a certain resource identifier for a target resource 120 may not be presented to a DS originator 118, the viewing policy can provide an identifier that indicates that a proxy name is to be presented to the DS originator 118 in lieu of the resource identifier. In like manner, when an originator viewing policy and/or target viewing policy indicates that a certain resource identifier of a DS originator 118 may not be presented to a target resource 120, the viewing policy can provide an identifier that indicates that a proxy name is to be presented to the target resource 120 in lieu of the resource identifier. Thus, as used herein, a "proxy name" is an identifier that identifies a DS originator 118 or target resource 120 without identifying the DS originator's/target resource's real, used, given, or legal name. For instance, a proxy name can indicate a DS originator's or target resource's position or role within an agency. Examples of proxy names can include, but are not limited to, "Police Chief," "Battalion Commander," "Incident 123 Commander," "Detective," "Beat Responder," "Governor," and so on.

Further, when a viewing policy indicates that a certain contact address for a target resource 120 may not be presented to a DS originator 118, the viewing policy can provide an identifier that indicates that a proxy contact address is to be presented to the DS originator 118. When a viewing policy indicates that a certain contact address for a DS originator 118 may not be presented to a target resource 120, the viewing policy can provide an identifier that indicates that a proxy contact address is to be presented to the target resource 120 in lieu of the contact address. Thus, as used herein, a "proxy contact address" is an identifier that corresponds to a contact address and which may be presented to a DS originator 118 and/or a target resource 120 in lieu of the contact address. Moreover, a proxy contact address may be selected by a DS originator 118 to initiate contact with a target resource 120 at the contact address that is associated with the proxy contact address. As noted, the contact address can be associated with a particular device via which the target resource 120 may be contacted.

The proxy names and/or proxy contact addresses can be generated by a proxy server 130, which may be a component of the DS 102 or otherwise communicatively linked to the DS 102. When a DS originator 118 initiates contact with a target resource 120, the DS 102 can process the data 114 to identify the applicable originator viewing policy. The DS 102 can also indicate to the proxy server 130 whether a proxy name and/or proxy contact address for the DS originator 118 is to be presented to the target resource 120. Similarly the DS 102 can also indicate to the proxy server 130 whether a proxy name and/or proxy contact address for the target resource 120 is to be presented to the DS originator 118. Likewise, when a target resource 120 is being contacted by a DS originator 118, the DS 102 can process the data 116 to identify the applicable target viewing policy. As above, the DS 102 can also indicate to the proxy server 130 whether a proxy name and/or proxy contact address for the target resource 120 is to be presented to the DS originator 118, and whether a proxy name and/or proxy contact address for the DS originator 118 is to be presented to the target resource 120.

It should be noted that in some embodiments, a proxy name and/or proxy contact address can have a 1:1 ratio between target resource:DS originator or between DS originator:target resource. For example, a proxy name and/or proxy contact address is associated with exactly one target resource in the DS 102, and assigned by the DS 102 to be used by one DS originator at any given time. In other embodiments, a proxy name and/or proxy contact address can have a 1:x ratio between target resource:DS originator or between DS originator:target resource, where x is an integer greater than 1. For example, a proxy name and/or proxy contact address is associated with exactly one target resource at any given time in the DS 102, and can be assigned by the DS to be used by one or more DS originators at any given time. In yet other embodiments, a proxy name and/or proxy contact address can have a x:1 ratio between target resource:DS originator or between DS originators:target resource, where x is an integer greater than 1. For example, a proxy name and/or proxy contact address can be associated with one or more target resources at any given time in the DS 102, but assigned by the DS 102 to be used by only one DS originator at any given time. In still yet other embodiments, a proxy name and/or proxy contact address can have a x:y ratio between the target resources:DS originators or between DS originators:target resources, where x and y are integers greater than 1. For example, a proxy name and/or proxy contact address can be associated with one or more target resources at any given in the DS 102, and assigned by the DS 102 to be used by one or more DS originators at any given time. Each application supported by a device may require a different proxy contact address depending on at least one policy associated with the DS originator 118 and/or target resource 120. For example, if the device supports more than one application (e.g. telephony and PTT), a different proxy name and/or proxy contact address may be associated with each application on the device.

It should also be noted that in some embodiment, a proxy name and/or proxy contact address can be associated in the DS 102 and/or assigned by the DS 102 with a timer that is sufficiently long (e.g. 1 week) to ensure sufficient time for the communication between DS originator 118 and target resource 120 before the proxy name and/or proxy contact address can be re-associated in the DS 102 and/or re-assigned by the DS 102 at a future point. In other embodiments, the proxy name and/or proxy contact address would never be re-associated in the DS and/or re-assigned by the DS 102, thus making each association and/or assignment unique. In still other embodiments, the proxy name and/or proxy contact address can be re-associated in the DS 102 and/or re-assigned by the DS 102 after a period of inactivity or the DS originator 118 and/or target resource 120 de-registers from the network.

In one arrangement, the proxy contact addresses generated by the proxy server 130 can be temporary identifiers that are dynamically generated specifically for the DS originator 118 and/or target resource 120. In illustration, proxy contact addresses for a particular target resource 120 may only be used by a specific DS originator 118 to contact the target resource 120. Similarly, proxy contact addresses for a particular DS originator 118 may only be used by a specific target resource 120 to respond to that DS originator 118. Accordingly, if a DS originator 118 or target resource 120 shares a proxy contact address with another entity, that entity will not be able to use the proxy contact addresses to contact the target resource 120 or DS originator 118 with which the proxy contact address is associated. In other words, the proxy contact address can only be used by the DS originator/target resource that is assigned to use the proxy contact address by the DS 102. Thus, unauthorized contact of target resources 120 and/or DS originators 118 can be mitigated.

In addition to the viewing policies, access policies also can be implemented to prevent unauthorized contact of target resources 120. For instance, the originator policies can define originator access policies which include one or more identifiers that indicate target resources 120 that a DS originator 118 is authorized to contact and/or one or more identifiers that indicate target resources 120 that a DS originator 118 is not authorized to contact. In a similar manner, the target policies can define target access policies which include one or more identifiers that indicate DS originators 118 that are allowed to initiate contact with target resources 120 and/or DS originators 118 that are not allowed to initiate contact with target resources 120.

When a DS originator 118 attempts to establish communication with a target resource 120, the DS 102 can retrieve and process at least one of the originator access policies associated with the DS originator 118 and/or target access policies associated with the target resource 120 to determine whether to allow the DS originator 118 to establish contact with the target resource 120. If the originator access policies and/or the target access policies do not prevent the DS originator 118 from establishing communication with the target resource 120, then the DS 102 can allow the DS originator 118 to proceed with establishing communication with the target resource 120. For example, the DS originator 118 can retrieve the contact address (e.g. telephone number) for the target resource 120 from DS 102. The DS originator 118 can choose to establish communication (e.g. telephony call) with the target resource 120. A request from the DS originator 118 to establish communication with the target resource 120 is initially routed to the DS 102, which applies the relevant policy/policies (e.g. access policy) to determine whether the DS originator 118 is allowed to proceed to establish communication with the target resource 120.

When an agency resource is a DS originator 118, the originator policies applicable to that resource may not completely correlate to the target policies applicable to the target resource 120 that is being contacted. In this case, the most restrictive policies selected from the applicable originator policies and the target policies can be applied by the DS 102. For example, if the originator viewing policies associated with a DS originator 118 are more restrictive than the target viewing policies associated with a target resource 120, the originator viewing policies associated with the DS originator 118 can be applied to determine whether the proxy server 130 should generate a proxy name and/or proxy contact address. If, however, the target viewing policies associated with the target resource 120 are more restrictive than the originator viewing policies associated with the DS originator 118, the target viewing policies of the target resource 120 can be applied to determine whether the proxy server 130 should generate a proxy name and/or proxy contact address.

Rather than specifically defining policy data for each individual resource, group policies may be defined and assigned to groups of resources. For example, originator group policies can be defined for various groups of potential DS originators, and each of these DS originator group policies can be assigned to one or more resources. Likewise, target group policies can be defined for various groups of potential target resources, and each of these target group policies can be assigned to one or more resources. Further, originator group policies and/or target resource group policies that are assigned to the resources can be assigned automatically based on the positions and/or roles of the resources. When positions and/or roles dynamically change, the call originating group policies and/or target resource group policies also can be dynamically changed accordingly.

The data 114, 116 can be updated (e.g. added, deleted and/or changed) to the DS data 106, 108 by agencies or other parties authorized to populate the data. For example, the data 114 can be updated in response to receiving corresponding data from an agency administrator 126 within the first agency 110 that is authorized to perform data updates. Similarly, data 116 can be updated to the DS data 108 in response to receiving corresponding data from an agency administrator 128 within the second agency 112 that is authorized to perform data updates. The data 114 and 116 can be updated to the DS 102, for instance using a suitable application.

The respective agency administrators 126, 128 can access the DS 102 via the communication network(s) 104 or via any other suitable communication mediums. In one arrangement, the agency administrators 126, 128 can be people who communicate with the DS 102 via a suitable communication device, such as a network terminal, an access terminal, or a computer. The agency administrators 126, 128 can communicate with the DS 102 via a web-based application hosted on a server that interfaces with the DS 102, an application hosted locally that interfaces with the DS 102, or in any other suitable manner. In another arrangement, the agency administrators 126, 128 can be implemented as suitable applications instantiated on a processing device, such as a computer or server, which interfaces with the DS 102.

The DS data 106 further can include the DS originator context 122 for one or more DS originators 118 within the first agency 110, as well as target resource context 124 for one or more target resources 120 within the second agency 112. Of course, context data for one or more target resources in the first agency 110 and context data for one or more DS originators in the second agency 112 also can be provided. Such context data is not presented in the present example, however, for the purpose of clarity.

The DS originator context 122 can include data relevant to the present circumstances associated with the DS originator 118, and the target resource context 124 can include data relevant to the present circumstances of the target resource 120. In this regard, the contexts 122, 124 can include contextual information that is statically assigned and/or contextual information that is dynamically updated. Examples of static contextual information include, but are not limited to, an agency resource's role in an agency, the agency resource's special capabilities (e.g. hazardous material certification, scuba diving, chemical specialist, hostage negotiator, medical certifications, etc.), and the agency resource's agency name and address. Examples of dynamic contextual information include, but are not limited to, the agency resource's presence state (e.g. on-line, off-line, busy, etc.), the agency resource's current location, the weather conditions at the agency resource's current location, traffic and/or travel conditions at the agency resource's current location, and one or more applications currently available for use by the agency resource (e.g. telephony, push-to-talk, etc.).

When the DS originator context 122 contains dynamically generated information and/or when the target resource context 124 contains dynamically generated information, the DS originator context 122 and/or the target resource context 124 can be updated when the DS originator 118 initiates contact with the target resource 120, or the respective contexts 122, 124 can be maintained by the DS 102 and periodically updated, for example once a minute, every ten minutes, every half-hour, etc.

Further, the DS 102 can associate the target resource context 124 and DS originator context 122 when the DS originator 118 initiates contact with the target resource 120. Thus, unless target and/or originator policies specify otherwise, the target resource context 124 can be shared with the DS originator 118, and the DS originator context 122 can be shared with the target resource 120.

The DS originator context 122 can include data that indicates the present originator policies applicable to the DS originator 118, and the target resource context 124 can include data that indicates the target policies applicable to the target resource 120. Accordingly, the applicable originator policies and target policies can be static policies or policies that are dynamically selected in real-time based on the present circumstances related to the DS originator 118 and/or target resource 120. For example, if a particular target resource 120 is presently a member of a response team responding to a particular incident, then the target resource context 124 can indicate the target policies that are applicable in this particular circumstance. Still, the originator policies and target policies can be dynamically selected based on any other circumstances and the invention is not limited in this regard.

In addition, the DS originator context 122 can include data that indicates the present location of the DS originator 118, and the target resource context 124 can include data that indicates the present location of the target resource 120. The present locations can be determined using a global positioning system (GPS), a local positioning system, automatic vehicle location, identifying static locations associated with DS originator 118/target resource 120 (e.g. office locations), radio frequency identification (RFID) tags, or the present locations can be determined in any other suitable manner.

The DS originator context 122 and target resource context 124 also can include presence information related to the respective DS originator 118 or target resource 120. The presence information can indicate whether the DS originator 118/target resource 120 is presently accessible via a particular communication means (e.g. via e-mail, IM, telephony, push-to-talk, etc.), whether the DS originator 118/target resource 120 is presently on duty, whether the DS originator 118/target resource 120 is presently in the office or in the field, etc.

The DS originator context 122 and target resource context 124 further may include real-time traffic information and/or real-time weather information associated with the respective DS originator 118 or target resource 120. For example, if the DS originator 118 is currently at an incident scene, the DS originator context 122 can include present traffic information and/or weather information at the incident scene. Similarly, if the target resource 120 is at another incident scene, the target resource context 124 can include present traffic information and/or weather information at the other incident scene.

The real-time traffic information and real-time weather information can be updated by the DS 102 by accessing data from a real-time traffic service 132 and a real-time weather service 134, respectively. For example, the DS can communicate with the real-time traffic service 132 and the real-time weather service 134 via a wide area network, such as the Internet.

It should be noted that the inventive arrangements described herein are not limited to the examples of context data that have been described. Indeed, any of a myriad of other context data can be included in the DS originator context 122 and the target resource context 124, and the invention is not limited in this regard. For example, biometric data of DS originators 118 and/or target resources 120 can be included in the DS originator context 122 and the target resource context 124, as well as any other context that may be of use to determine the present circumstances associated with a DS originator 118 and/or target resource 120.

FIGS. 2A and B depict an example of a data table 200 that is useful for understanding the present invention. The data table 200 can be stored in a database or in any other suitable information format which allows the data table 200 to be updated with data. As used herein, the term "update," means to add data, delete data and/or to change data. The data table 200 manages the contact information for the agency resources using a DS.

The data table 200 can include a number of fields for DS data that can be associated with agency resources. For example, the data table 200 can include, but is not limited to, a field 202 for a resource identifier for the agency resource, a field 204 that indicates groups with which the agency resource is associated (e.g. as a member of the group), a field 206 that indicates a home identifier for the agency resource, a field 208 that indicates one or more specialized capabilities of the agency resource, a field 210 that indicates a device associated with the agency resource, a field 212 that indicates a type of application associated with the device, a field 214 for a contact address at which the agency resource may be contacted via the application, a field 216 that indicates one or more types of resource context, as described below, that may be associated with the agency resource (e.g. how to obtain a current location of the agency resource), a field 218 that indicates a policy applicable to the agency resource when the agency resource is a DS originator (e.g. a viewing policy), a field 220 that indicates a policy applicable to the agency resource when the agency resource is a target resource (e.g. a viewing policy, etc.), and so on. It should be noted that, depending on the agency or system requirements, the policies indicated in fields 218 and 220 may be combined into a single policy, or separated into additional policies. In accordance with the present invention, a policy can, for example, indicate to the DS 102 whether the DS originator and/or the target resource is authorized to view or be presented with at least a portion of the contact information associated with the DS originator and/or target resource. Thus, when determining whether at least a portion of the contact information associated with an agency resource can be viewed, the DS 102 can rely on at least one of the policies associated with the DS originator or the target resource. In other words, the DS 102 can rely on the policy associated with the DS originator, the policy associated with the target resource, the policies associated with both the DS originator and target resource, or a combination thereof. Further, depending on the agency or system requirements, the DS 102 can always rely on one policy over the other policy based on other contact information in the records for the DS originator and target resource (e.g. the policy associated with the Police Chief is always relied upon instead of the policy associated with the Beat Responder, regardless if the Police Chief is the DS originator or the target resource).

In addition, a policy can indicate to the DS 102 how the contact information is presented to an agency resource. For example, at least one of the policies associated with the DS originator or the target resource can indicate whether a proxy name and/or a proxy contact address is presented to the DS originator and/or target resource in lieu of the actual resource identifier and/or actual contact address of the agency resource. Some examples of providing a proxy name and proxy contact address is when a DS originator needs to contact an investigator for a particular incident scene. The DS originator may not know that Detective Johnson is acting as lead investigator for the particular incident scene, so a policy associated with Detective Johnson can indicate to the DS 102 to provide a proxy name for Detective Johnson as "Lead Investigator". Similarly, being the "Lead Investigator" for this particular incident scene, Detective Johnson may not want her direct telephone number distributed to individuals outside her home agency. As such, a policy associated with Detective Johnson can indicate to the DS 102 to provide a proxy contact address for her device when the DS originator 118 that is trying to establish communication with her is outside of her home agency.

The data table 200 further includes examples of records that may be generated for various agency resources. For instance, a record 222 is depicted for an agency resource "Beat 4 Responders," which in this example is a group associated with an agency. The record 222 also includes various fields 202-220 that are applicable to that agency resource. In the present example, since the agency resource identified in the record 222 is a group, a group membership identifier in field 204 need not be provided, although this need not be the case. Nonetheless, the record 222 can include an identifier for a particular type of device in field 210 via which members of the group may be contacted, as well as other information and policies associated with the agency resource.

As noted, one or more types of resource context that may be associated with the agency resource in field 216. For instance, the resource context identifier in field 216 can indicate how to obtain a current location of the target resource (e.g. using automated vehicle location (AVL)), and other contextual information that may be available (e.g. weather conditions, traffic conditions, present location of the agency resource, etc.).

A record can also depict an individual, for example record 224 is depicted for "Officer John Smith." The group membership identifier in field 204 for record 224 can indicate a group with which Officer John Smith is a member, such as "Beat 4 Responders." Further, the record 224 also can include other contact information and other policies associated with Officer John Smith, such as those previously described.

Record 226 corresponds to another agency resource. However, in contrast to records 222, 224, the agency resource in record 226 is identified by a position or role of the agency resource within the agency rather than by a particular employee identifier. Further, record 226 and record 228 correspond to the same resource identifier (i.e. "Chief of Police"), however, record 226 corresponds to a first application (i.e. presence) for the desktop device associated with the resource identifier and record 228 corresponds to a second application (i.e. VoIP) for the desktop device.

Record 230 depicts an example of an agency resource that is a device, as well as contact information and policies associated with the device. Record 232 depicts another example of an agency resource that is identified by a role or position within the agency, as well as a particular device, contact information and policies associated with that agency resource. Notwithstanding these examples, any of a myriad of other records can be generated for agency resources in accordance with the inventive arrangements described herein.

In one arrangement, the policies when the agency resource is a DS originator or a target resource can be automatically updated in field 218 and 220 for a particular record based upon at least one other piece of contact information in the record. In another arrangement, the policies when the agency resource is a DS originator or a target resource can be selected at the time communication is initiated by the agency resource or to the agency resource. For example, referring to record 226, if the context associated with an agency resource (e.g. DS originator context or target resource context) indicates that the agency resource is presently a member of a particular group, the policy used when the agency resource is a DS originator 118 or a target resource 120 can be selected based on the group membership. Nonetheless, the policy when the agency resource is a DS originator 118 or a target resource 120 can be dynamically or manually selected in any other suitable manner and the invention is not limited in this regard.

Figure 3:
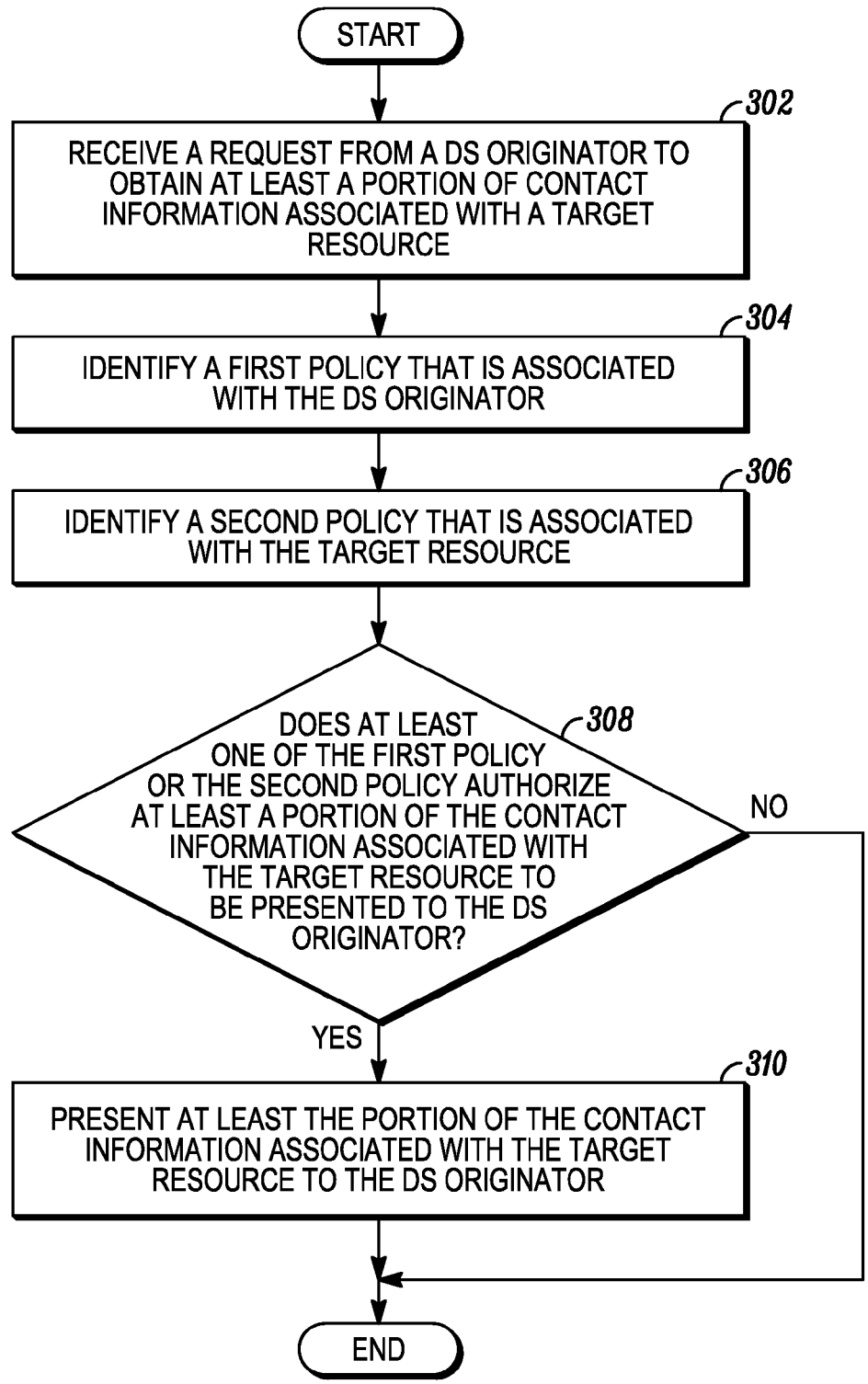
FIG. 3 depicts a flowchart which outlines an example of a DS originator attempting to retrieve information from the DS in accordance with the present invention.
Figure 4:
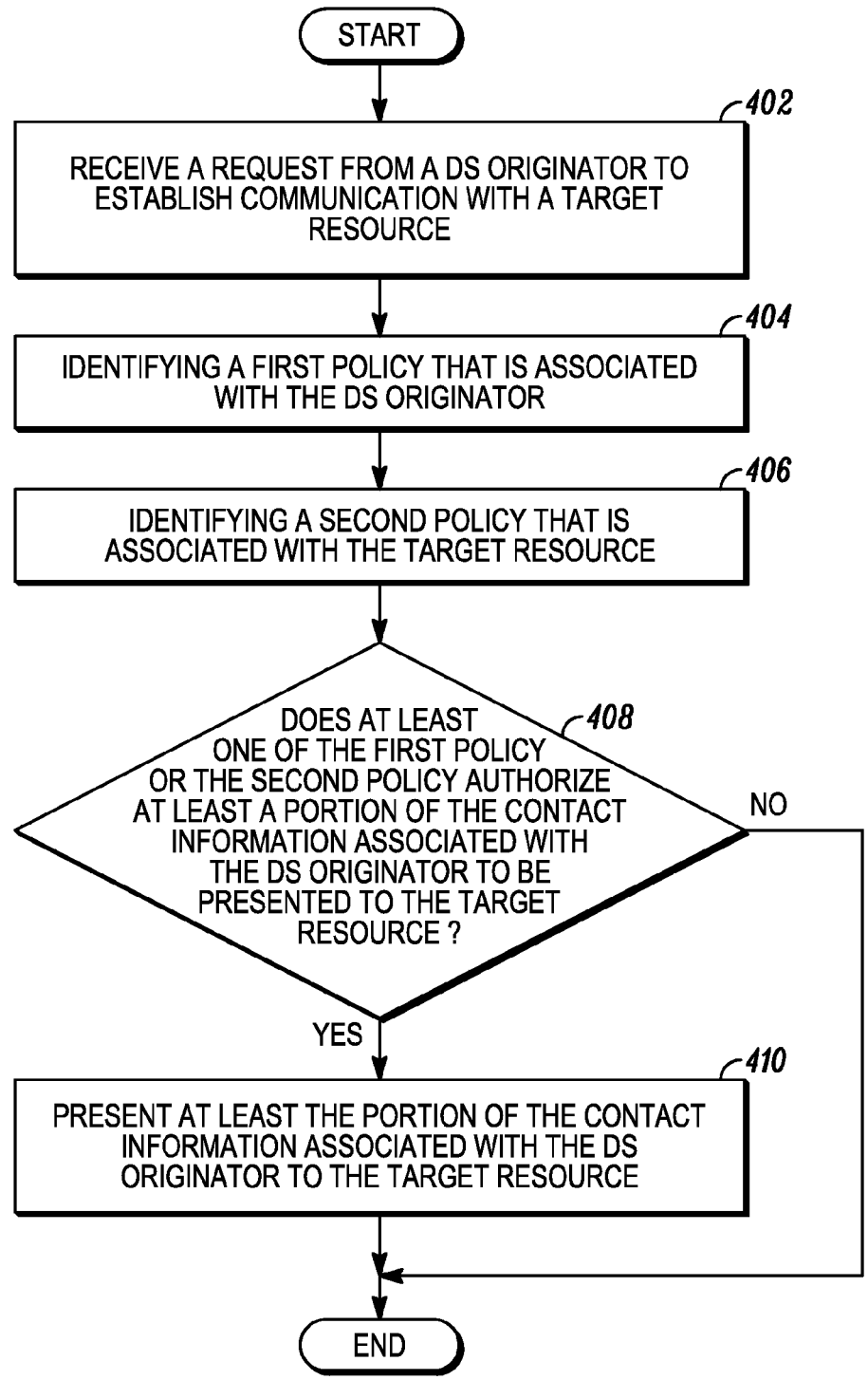
FIG. 4 depicts a flowchart which outlines an example of a DS originator attempting to initiate communication with a target resource through the DS in accordance with the present invention.

Let us now turn the discussion to the operation of the DS 102. FIGS. 3 and 4 are flowcharts that present methods 300 and 400 for providing contact information via the DS 102, which are useful for understanding the present invention. Referring first to FIG. 3, at step 302, the DS 102 receives a request from a DS originator 118 to obtain at least a portion of contact information associated with a target resource 120. Upon receipt, the DS 102 identifies a first policy that is associated with the DS originator 118, at step 304, and identifies a second policy that is associated with the target resource 120, at step 306. Based on at least one of the policies, the DS 102 determines whether at least the portion of the contact information associated with the target resource 120 is authorized to be presented to the DS originator, at step 308. It is important to note that this determination may be based on the policy associated with the DS originator, the policy associated with the target resource, the policies associated with both the DS originator and the target resource, or a combination thereof. If authorized, the DS 102 presents at least the portion of the contact information associated with the target resource to the DS originator, at step 310; otherwise the DS 102 does not present the DS originator 118 with the request contact information associated with the target resource 120 (e.g. at least one of the policies associated with the DS originator or the target resource may indicate that "Officer Smith" is not allowed to contact "Chief of Police").

As noted above, examples of contact information associated with the target resource that can be presented to the DS originator include, but is not limited to at least one of the following: at least one resource identifier, at least one group membership, at least one home identifier, at least one specialized capability, at least one contact address associated with a type of application, a type of device associated with a contact address, a type of application associated with a contact address, a context type, a policy, or the like. Notwithstanding these examples, any other suitable contact information associated with the target resource can be updated in the DS 102 and presented to the DS originator and the invention is not limited in this regard.

When a portion of the contact information being presented to the DS originator 118 is a resource identifier for the target resource, the DS 102 can present a proxy resource identifier associated with the target resource to the DS originator based on at least one of the policies associated with the DS originator and/or target resource in lieu of the actual resource identifier. Likewise, when a portion of the contact information being presented to the DS originator 118 is a contact address for the target resource, the DS 102 can present a proxy contact address associated with the target resource to the DS originator based on at least one of the policies associated with the DS originator and/or target resource in lieu of the actual contact address. It should be noted that even though these two examples refer to the resource identifier and the contact address, any contact information stored in the DS 102 can be presented to the DS originator via a proxy server based on at least one of the policies associated with the DS originator and/or target resource.

Let us now refer to FIG. 4. The steps in FIG. 4 are similar to those steps described in FIG. 3, however, FIG. 4 focuses on the DS 102 determining whether to present at least a portion of the contact information associated with the DS originator 118 to the target resource 120 upon establishing communication between the DS originator 118 and the target resource 120. At step 402, the DS 102 receives a request from a DS originator 118 to establish communication with a target resource 120. Upon receipt, the DS 102 identifies a first policy that is associated with the DS originator 118, at step 404, and identifies a second policy that is associated with the target resource 120, at step 406. Based on at least one of the policies, the DS 102 determines whether at least the portion of the contact information associated with the DS originator 118 is authorized to be presented to the target resource 120, at step 408. Again, it is important to note that this determination may be based on the policy associated with the DS originator 118, the policy associated with the target resource 120, the policies associated with both the DS originator 118 and the target resource 120, or a combination thereof. If authorized, the DS 102 presents at least the portion of the contact information associated with the DS originator 118 to the target resource 120, at step 410; otherwise the DS 102 does not present the DS originator 118 with the requested contact information associated with the target resource 120 (e.g. at least one of the policies associated with the DS originator 118 or the target resource 120 may indicate that "Officer Smith" is not allowed to contact "Chief of Police"). Examples of contact information associated with the DS originator 118 can be the same or similar to those described above with respect to the target resource 120. Notwithstanding those examples, any other suitable contact information associated with the DS originator 118 can be updated in the DS 102 and presented to the target resource 120 and the invention is not limited in this regard.

Moreover, the DS 102 can present a proxy resource identifier associated with the DS originator 118 to the target resource 120 based on at least one of the policies associated with the DS originator 118 and/or target resource 120 in lieu of the actual resource identifier in a similar fashion as described above. Likewise, the DS 102 can present a proxy contact address associated with the DS originator 118 to the target resource 120 based on at least one of the policies associated with the DS originator 118 and/or target resource 120 in lieu of the actual contact address.

Although the preceding examples and figures have been focused on public safety agencies, it should be obvious to one skilled in the art that this invention is applicable to more than the public safety marketplace. Specifically, the identity protection methods outlined by this invention can be used by other telecommunication systems, such as public and private wired and wireless systems (4G, LTE, WiMAX, CDMA, HRPD, UMTS, P25, LMR, etc.), and enterprises. In one example, a family could be an agency that can advertise family members' contact information (with policy) in a public cellular directory service. In another example, a large corporation could be an agency that can advertise their employee contact information using their enterprise Intranet.

The flowcharts and block diagram in the figures illustrate the architecture, functionality, and operation of possible implementations of systems, methods and computer program products according to various embodiments of the present invention. In this regard, each block in the flowcharts or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embedded in a computer-usable medium, such as a computer program product or other data programs storage device, readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods. Thus, in accordance with one arrangement of the present invention, a storage medium having stored thereon a set of instructions which, when loaded into a hardware device, causes the hardware device to perform the following functions: receive a request from a DS originator 118 to obtain at least a portion of contact information associated with a target resource 120; identify a first policy that is associated with the DS originator 118; identify a second policy that is associated with the target resource 120; based on at least one of the policies, determine whether at least the portion of the contact information associated with the target resource is authorized to be presented to the DS originator 118; and when at least the portion of the contact information associated with the target resource 120 is authorized to be presented to the DS originator 118, present at least the portion of the contact information associated with the target resource 120 to the DS originator 118. In accordance with another arrangement of the present invention, a storage medium having stored thereon a set of instructions which, when loaded into a hardware device, causes the hardware device to perform the following functions: receive a request from a DS originator 118 to establish communication with a target resource 120; identify a first policy that is associated with the DS originator 118; identify a second policy associated with the target resource 120; based on at least one of the policies, determine whether at least a portion of contact information associated with the DS originator 118 is authorized to presented to the target resource 120; and when at least a portion of the contact information associated with the DS originator 118 is authorized to be presented to the target resource 120, present at least the portion of the contact information associated with the DS originator 118 to the target resource 120.

As used herein, the term "real-time" means a level of processing responsiveness that a resource or system senses as sufficiently immediate for a particular process or determination to be made, or that enables the processor to keep up with some external process.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof. Accordingly, reference should be made to the following claims, rather than to the foregoing specification, as indicating the scope of the invention.

What is claimed is:

1. A method for providing contact information via a directory service (DS), the method comprising computer implemented operations of:
   receiving a request from a DS originator to obtain at least a portion of contact information associated with a target resource prior to establishing a communication session with the target resource;
   in response to receiving the request, identifying a first policy that is a DS access and/or viewing policy of the DS originator and identifying a second policy that is a DS access and/or viewing policy of the target resource;
   based on both the first policy and the second policy, determining whether at least the portion of the contact information associated with the target resource is authorized to be presented to the DS originator;
   when at least the portion of the contact information associated with the target resource is authorized to be presented to the DS originator, determining and modifying a portion of the contact information associated with the target resource for presentation to the DS originator in accordance with at least one of the policies;
   presenting the modified portion of the contact information associated with the target resource to the DS originator; and
   in response to presenting the modified portion of the contact information to the DS originator, receiving, from the DS originator, an attempt to proceed with the establishment of the communication session with the target resource.

2. The method of claim 1, wherein at least the portion of the contact information associated with the target resource comprises at least one of the following: a resource identifier for the target resource, a group membership of the target resource, a home identifier of the target resource, a contact address of the target resource, a type of device associated with the contact address, and a type of application associated with the contact address.

3. The method of claim 1, wherein at least the portion of contact information is a resource identifier for the target resource, and wherein presenting the modified portion of the contact information associated with the target resource to the DS originator comprises presenting a proxy resource identifier associated with the target resource to the DS originator based on both the first policy and the second policy in lieu of the resource identifier.

4. The method of claim 3, further comprising:
   associating the proxy resource identifier with the target resource in the DS; and
   assigning, by the DS, the proxy resource identifier to the DS originator, wherein the proxy resource identifier can only be used by the DS originator that is assigned to use the proxy resource identifier by the DS.

5. The method of claim 4, further comprising at least one of:
   associating the proxy resource identifier with exactly one target resource in the DS and assigning by the DS for use by one DS originator;
   associating the proxy resource identifier with exactly one target resource in the DS and assigning by the DS for use by a plurality of DS originators;
   associating the proxy resource identifier with a plurality of target resources in the DS and assigning by the DS for use by one DS originator; and
   associating the proxy resource identifier with a plurality of target resources in the DS and assigning by the DS for use by a plurality of DS originators.

6. The method of claim 4, further comprising associating a timer with the proxy resource identifier such that the DS can re-associate the proxy resource identifier to a different target resource or re-assign the proxy resource identifier to a different DS originator upon expiration of the timer.

7. The method of claim 1, wherein at least the portion of contact information is the contact address for the target resource, and wherein presenting the modified portion of the contact information associated with the target resource to the DS originator comprises presenting a proxy contact address associated with the target resource to the DS originator based on both the first policy and the second policy in lieu of a contact address.

8. The method of claim 7, further comprising:
   associating the proxy contact address with the target resource in the DS; and
   assigning, by the DS, the proxy contact address to the DS originator.

9. The method of claim wherein the proxy contact address can only be used by the DS originator that is assigned to use the proxy contact address by the DS.

10. The method of claim 8, further comprising at least one of:
    associating the proxy resource identifier with exactly one target resource in the DS and assigning by the DS for use by one DS originator;
    associating the proxy resource identifier with exactly one target resource in the DS and assigning by the DS for use by a plurality of DS originators;
    associating the proxy resource identifier with a plurality of target resources in the DS and assigning by the DS for use by one DS originator; and
    associating the proxy resource identifier with a plurality of target resources in the DS and assigning by the DS for use by a plurality of DS originators.

11. The method of claim 8, further comprising associating a timer with the proxy contact address such that the DS can re-associate the proxy contact address to a different target resource or re-assign the proxy contact address to a different DS originator upon expiration of the timer.

12. The method of claim 1, wherein the first policy includes at least one identifier, with each identifier indicating a particular target resource for which at least a portion of the contact information is authorized to be presented to the DS originator, and wherein the second policy includes at least one identifier, with each identifier indicating a particular DS originator that is authorized to be presented at least a portion of contact information associated with the target resource.

13. The method of claim 1, wherein the communication session comprises a half-duplex push-to-talk call.

14. The method of claim 1, wherein the communication session comprises a video communication session.

15. The method of claim 1, wherein at least the portion of the contact information associated with the target resource is a contact address of the target resource and the request did not specify the contact address of the target resource.

16. A non-transitory computer storage medium having stored thereon a set of instructions which, when loaded into a hardware device, causes the hardware device to perform the following functions:
- receive a request from a DS originator to obtain at least a portion of contact information associated with a target resource prior to establishing a communication session with the target resource;
- in response to receiving the request, identify a first policy that is a DS access and/or viewing policy of the DS originator and identify a second policy that is a DS access and/or viewing policy of the target resource;
- based on both the first policy and the second policy, determine whether at least the portion of the contact information associated with the target resource is authorized to be presented to the DS originator; and
- when at least the portion of the contact information associated with the target resource is authorized to be presented to the DS originator, determine and modify a portion of the contact information associated with the target resource in accordance with at least one of the policies;
- present the modified portion of the contact information associated with the target resource to the DS originator; and
- in response to presenting the modified portion of the contact information to the DS originator, receive, from the DS originator, an attempt to proceed with the establishment of the communication session with the target resource.

17. The non-transitory computer storage medium of claim 16, wherein the communication session comprises a half-duplex push-to-talk call.

18. The non-transitory computer storage medium of claim 16, wherein the communication session comprises a video communication session.

19. The non-transitory computer storage medium of claim 16, wherein at least the portion of the contact information associated with the target resource comprises at least one of the following: a resource identifier for the target resource, a group membership of the target resource, a home identifier of the target resource, a contact address of the target resource, a type of device associated with the contact address, and a type of application associated with the contact address.

20. The non-transitory computer storage medium of claim 16, wherein at least the portion of the contact information associated with the target resource is a contact address of the target resource and the request did not specify the contact address of the target resource.

* * * * *